Patented Feb. 6, 1934

1,946,052

UNITED STATES PATENT OFFICE 1,946,052

PROCESS OF MANUFACTURING PIGMENTS

Julian T. Baldwin, West Chester, Pa., assignor to Sandura Company, Inc., Paulsboro, N. J., a corporation of New Jersey No Drawing. Application September 27, 1930
Serial No. 484,937

8 Claims. (Cl. 134—58)

This invention relates to improvements in the manufacture of pigments.

Among other features of the invention it is desired to so modify the surface energy characteristics of ordinary pigments as to give these pigments greatly improved qualities not hitherto attainable.

The present invention is a continuation in part of my copending application Serial No. 399,394, filed Oct. 12, 1929.

Heretofore the qualities of pigments have depended largely on the materials from which the pigments have been made, and on the manner of making them. By the process of the present invention, on the other hand, any kind of pigment, no matter how it has been made, may be treated by a process entirely separate from and independent of its own manufacture, whereby its qualities become greatly improved.

Some of the advantages of pigments treated in accordance with the present invention are:

1. Better color tone;
2. Greater ease of dispersion;
3. Control of yield value in plastic systems;
4. Better adhesion between pigment and binder or vehicle;
5. Better distribution of particle size;
6. Greater abrasion resistance and tensile strength of their plastics;
7. Smoother and glossier paints and plastics; and
8. Easy removal of moisture.

The surface energy characteristics of pigments play an important part in determining the properties of the pigment when in contact with a binder medium. Settling, cohesion, flocculation, gloss, weathering and abrasion resistance are all functions of the surface energy characteristics. Thus a lead paint on exposure chalks while a zinc oxide paint fails by cracking largely due to the different surface energy characteristics of the two pigments.

Pigments may have their surface energy characteristics greatly modified by coating their surfaces with a thin film of certain organic compounds. However it is very necessary that the material used for coating the pigment remain at the pigment binder interface if it is to have the desired effect. If the material is removed by the binding agent from the interface as would be an ordinary resin if it were used for coating, its effect would only be the same as if the same amount of resin was originally dissolved in the oil or binding medium. Or if the pigment were coated with an oil and the oil subsequently oxidized, the adhesion between the pigment and the oil in a paint would be very much the same as if the oil had been added to the pigment in the usual manner. That is, the interface would be between oil and pigment whether the pigment was added to the oil all at once or if the surface of the pigment had been covered with oil which was then oxidized and the resulting coated pigment added to the main body of oil to form the paint.

I have found however that desirable and permanent modification of the surface energy characteristics is obtained by causing water repellent metallic organic compounds to become adherent upon the surface of the pigment in the form of a thin film covering each pigment particle. In the first place, the most desirable metallic organic compounds as zinc soyate, zinc stearate, calcium oleate or aluminum stearate or resinate are insoluble in water and water repellent. And then it does not seem advisable to coat a pigment with a water soluble coating that is permanent since this would greatly destroy the waterproofing qualities of the paint film, linoleum or rubber product. In order to reduce the tendency for these metallic compounds to be removed from the pigment binder interface it is sometimes advisable to produce glue or calcium caseinate in conjunction with them. The coating material is always of different derivation from the pigment itself, being formed by a process entirely separate and independent from the process of chemical formation of the pigment.

The general procedure in treating pigments by my process is to place the pigment in a revolving tube heated to a relatively high temperature and to introduce into such tube hot fatty acid vapors. After allowing the hot vapors to contact with the pigment for a suitable length of time, the supply of vapors is cut off and unheated air is introduced while the contents of the tube are cooled. Preferably, the fatty acid vapors arising from the distillation of vegetable oils are employed, though others may be used.

Other methods of contacting fatty acid vapors with pigment may also be employed, such as introducing the vapors upwardly through screens containing the pigment, and other well-known methods for causing intimate contact between solids and gases or vapors.

A specific example of proportions and materials used is:

Into a revolving tube containing lithopone, said tube and contents being at a temperature of 550° F. are introduced the vapors from the distillation of soya bean oil at a temperature between 510° and 540° F. After the vapors have contacted with the pigment for from ten minutes to an hour, the vapors are cut off and unheated air is introduced slowly while the contents of the tube are cooled to 500° F. This temperature is maintained for half an hour, and the pigment after cooling is ready for shipment. Distillation may be accomplished using superheated steam at temperatures from 450° F. to 650° F. and drawing the gases from the pigment tube into a condenser. In this case the pigment may be kept slightly above the temperature of the entering vapors. To avoid the formation of decomposition products during distillation it is desirable in many cases to use fatty acids instead of their glycerides (natural oils). Using a high vacuum is another method of reducing the amount of decomposition. Still another method is that of bubbling a gas through the oil or fatty acid. Suitable ases are carbon dioxide, nitrogen, air and oxygen. In using air it is advisable to avoid temperatures above 625° F. due to the danger of combustion and explosion. With oxygen even lower temperatures should be used for the same reasons. Soya bean oil does not completely distill below 540° F., and in fact is only half distilled at 620° F. The distillation range of vegetable oils extends over a wide temperature range. Thus soya bean begins to distill at about 450° F. Excess of condensed fatty acid may be removed by heating the pigment to 590° F. for five to ten minutes.

The purpose of this procedure is to absorb the organic acid vapors on the surface of the pigment, then lower the temperature of the pigment so that the vapors condense, then maintain a temperature slightly below the condensation point until the organic acid has formed a metallic compound through reaction with the pigment. The time required depends on the reactivity and surface of the pigment. Thus zinc oxide requires a very much shorter time than the lithopone, since the zinc oxide reaction is instantaneous. In the case of the more active pigments, as zinc oxide, it is generally desirable to carry out the reaction without condensing the acids on the pigment. That is the acids react with sufficient rapidity with the pigment while the acids are in the vapor phase. By heating to 590° F. again, excess acid and decomposition products of the oil vapors are removed.

The advantage of the above procedure is to avoid contamination of the pigment with substances other than the desired soap. In the example the linoleic and other fatty acids come in direct contact with the pigment and act directly upon it, thus precluding any impurities.

The proportion of pigment to coating agent depends on the specific surface of the pigment. The larger the specific surface the larger is the amount of coating agent required to cover the surface.

It has been found that the soaps of the oxidized fatty acids of the vegetable oils are particularly well adapted for use as coatings for pigment or filler particles. This is because they are much less soluble in paint vehicles than soaps made from the usual unoxidized acids. Also, these soaps may be polymerized, or made from polymerized oxidized fatty acids. That is, they may be polymerized either after they are made, or the oxidized fatty acid may be polymerized and then made into soap. Pigments coated with the soaps made from these oxidized fatty acids will retain their coating indefinitely, while if pigments are coated with the soaps of the unoxidized fatty acids, this coating is somewhat unstable and liable to be dissolved in the paint vehicle.

Methods of applying these soaps as a coating to pigments by precipitating the soap upon the pigment from an aqueous medium containing the soap in suspension, have been set forth in detail in my copending application, Serial No. 399,394, filed October 12, 1929.

Oxidized fatty acids are prepared by saponifying "scrim oil" with lye or alcoholic potash and acidifying with hydrochloric acid. The resulting mixture is agitated with petroleum ether. The oxidized fatty acids then collect as sediment in the petroleum ether layer, or adhere to the sides of the vessel.

The soap formed from "scrim oil", which contains generally 50–65% oxidized fatty acids, will do satisfactorily in place of the soap made from the purified fatty acids.

Besides "scrim oil" made from linseed oil, "scrim oil" made from China-wood oil, or other drying or semi-drying vegetable oil may be used. Other processes besides the "scrim" process may be used to secure the required oxidation of the oil.

Wherever the term "pigment" appears in the specification and claims, it is meant to include not only pigments as technically considered, but also all varieties of particles including fillers and other materials of similar nature. Likewise, wherever the word "film" appears in the specification and claims, it is meant to include a group of very small particles of the water-repellent compound contained or carried on the surface of the pigment.

I claim:

1. The process of forming a metallic soap upon the surface of a pigment by treating the pigment with fatty acid vapors resulting from the distillation of soap-forming oils preferably at reduced pressures, the pigment thereby being caused to react with these condensed fatty acid vapors by keeping the pigment at a temperature of from 250° to 650° F. after contacting with the vapors.

2. The process of forming a metallic-organic compound upon the surface of a pigment by treating the pigment with fatty acid vapors resulting from the distillation of soap-forming oils, the vapors being absorbed by the pigment, then condensed on the pigment, and allowed to react with the pigment until a metallic-organic compound is formed.

3. A process of forming a metallic soap upon the surface of a pigment which comprises treating the pigment with fatty acid vapors at a sufficiently high temperature to cause the vapors to react with the pigment at its surface.

4. A process of forming a metallic soap upon the surface of a pigment which comprises treating the pigment with fatty acid vapors at a temperature sufficiently high to cause the vapors to react with the pigment at its surface and not high enough to cause reaction of the entire pigment body with the vapors.

5. A process of forming a metallic soap upon the surface of a pigment which comprises subjecting the surface of the pigment to hot fatty acid vapors.

6. A process of modifying the surface energy of pigments which comprises subjecting the pigment to a stream of hot fatty acid vapors derived from the distillation of soap-forming oil.

7. A process of coating the surface of a pigment which comprises heating the pigment, admitting hot fatty acid vapors from the distillation of soap-forming oil to contact with the pigment then cutting off the supply of fatty acid vapors and admitting unheated air to contact with the pigment while cooling the pigment.

3. A process of coating the surface of a pigment which comprises subjecting the surface of the pigment comprising a metal compound adapted to react with fatty acids, to hot oxidized fatty acid vapors to form a thin film of soap of the metal and the oxidized fatty acid on the surface of the pigment.

JULIAN T. BALDWIN.